ANALOG-TO-DIGITAL CONVERTER

Filed Nov. 12, 1963 3 Sheets-Sheet 1

INVENTORS
ARTHUR ROBERT ABBOTT
WILLIS E. LITTLEFIELD, JR.
BY GEORGE L. CHAPMAN, JR.

Curtis, Morris & Safford
ATTORNEYS.

ANALOG-TO-DIGITAL CONVERTER

Filed Nov. 12, 1963 3 Sheets-Sheet 2

INVENTORS
ARTHUR ROBERT ABBOTT
WILLIS E. LITTLEFIELD, JR.
BY GEORGE L. CHAPMAN, JR.
Curtis Morris & Safford
ATTORNEYS

ANALOG-TO-DIGITAL CONVERTER

Filed Nov. 12, 1963 3 Sheets-Sheet 3

INVENTORS
ARTHUR ROBERT ABBOTT
WILLIS E. LITTLEFIELD, JR.
BY GEORGE L. CHAPMAN, JR.
Curtis, Morris & Safford
ATTORNEYS United States Patent Office 3,293,637
Patented Dec. 20, 1966

3,293,637

ANALOG-TO-DIGITAL CONVERTER

Arthur Robert Abbott and Willis E. Littlefield, Jr., Dover, N.H., and George L. Chapman, Jr., York Village, Maine, assignors to Eastern Air Devices, Inc., Dover, N.H., a corporation of Delaware Filed Nov. 12, 1963, Ser. No. 322,840
15 Claims. (Cl. 340—347)

This invention relates to apparatus for converting analog information into digital information; more particularly, this invention relates to analog-to-digital converting apparatus utilizing a plurality of code members and sensing elements for developing digitally-coded electrical signals corresponding to the rotation or angular position of a rotary member in response to a rotary analog input.

A typical prior art converter using brushes as sensing elements includes a shaft which receives the rotary analog input, and a code disk which is driven by the shaft. The disk has on its surface concentric rows of alternatively-positioned conductive and insulating segments which are arranged in a digitally-coded pattern. A set of brushes mounted on a support called a "brush-block" is provided, with a brush being provided for each concentric row of coded segments. A voltage is applied to the code disk by means of one of these brushes. As the code disk is rotated, the other brushes make contact with the conductive and insulating segments in each row and are interconnected so as to provide digitally-coded electrical signals at their terminals.

In such converters each concentric row of segments on the code disk provides one digit in the binary-coded output of the device. For example, the outer-most row on the disk provides the "ones" digit for the output signal, the next row provides the "twos" digit, the next row provides the "fours" digit, and so forth.

Such converters are used, for example, as shaft-position encoders for converting the mechanical rotary output of liquid level indicators into electrical digital signals capable of being used in a digital computer.

In one type of prior art converter such as that shown in U.S. Patent 3,054,098 to Jacoby, two or more code disks and sets of matching brushes are used in order to provide an output having a sufficiently large number of digits for most purposes without the use of a large-diameter single disk that would otherwise be required. In such multiple-disk encoders each of the code disks is driven at a substantially different speed, with the slower-moving disks providing the more significant digits and the faster-moving disks providing the less significant digits for the output signal.

In prior multiple-disk converters the shaft, code disks, brushes and brush-blocks are mounted in a housing. The brush-blocks typically are mounted in the housing by means of screws fastened into the housing through arcuate slots in the brush-blocks. This arrangement is used in order to provide for adjustment of the angular positions of the brush-blocks to permit proper alignment of the code disks and brush-blocks with respect to one another.

A disadvantage of this arrangement is that, since the brush-blocks must be movable in the housing to provide for this alignment process, flexible electrical lead wires typically are used to connect the brushes. This impairs the reliability of the encoder since these flexible lead wires are liable to break under the stress of vibration, and since the insulation on the wires may deteriorate. Furthermore, the brush-block adjustment must be made with the outer covering of the converter removed. This means that the brush-block adjustment must be made at an intermediate point in the assembly of the unit, thus adding complication and expense to the assembly process. Also, since the brush-blocks are likely to shift after being subjected to shock and vibration, it is often necessary to remove the converter cover to readjust the brush-block positions. This allows dirt, dust and other contaminants to enter the converter, and otherwise adds to the complexity and expense of the maintenance of the unit.

Accordingly, an object of the present invention is to provide a multiple-code-member analog-to-digital converter in which alignment of the code members and sensing element holders of the unit may be made after assembly of the converter unit without removing its cover.

Another object of the present invention is to provide such a converter using brushes to sense the information on the code members without using flexible wires for making electrical connections to the brushes.

A further object of the present invention is to provide such a converter which is simple and inexpensive to manufacture and maintain, is compact, and is easy to mount and use by plugging it into an appropriate electrical receptacle.

The drawings and descriptions that follow describe the invention and indicate some of the ways in which it can be used. In addition, some of the advantages provided by the invention will be pointed out.

Figures 1, 2:
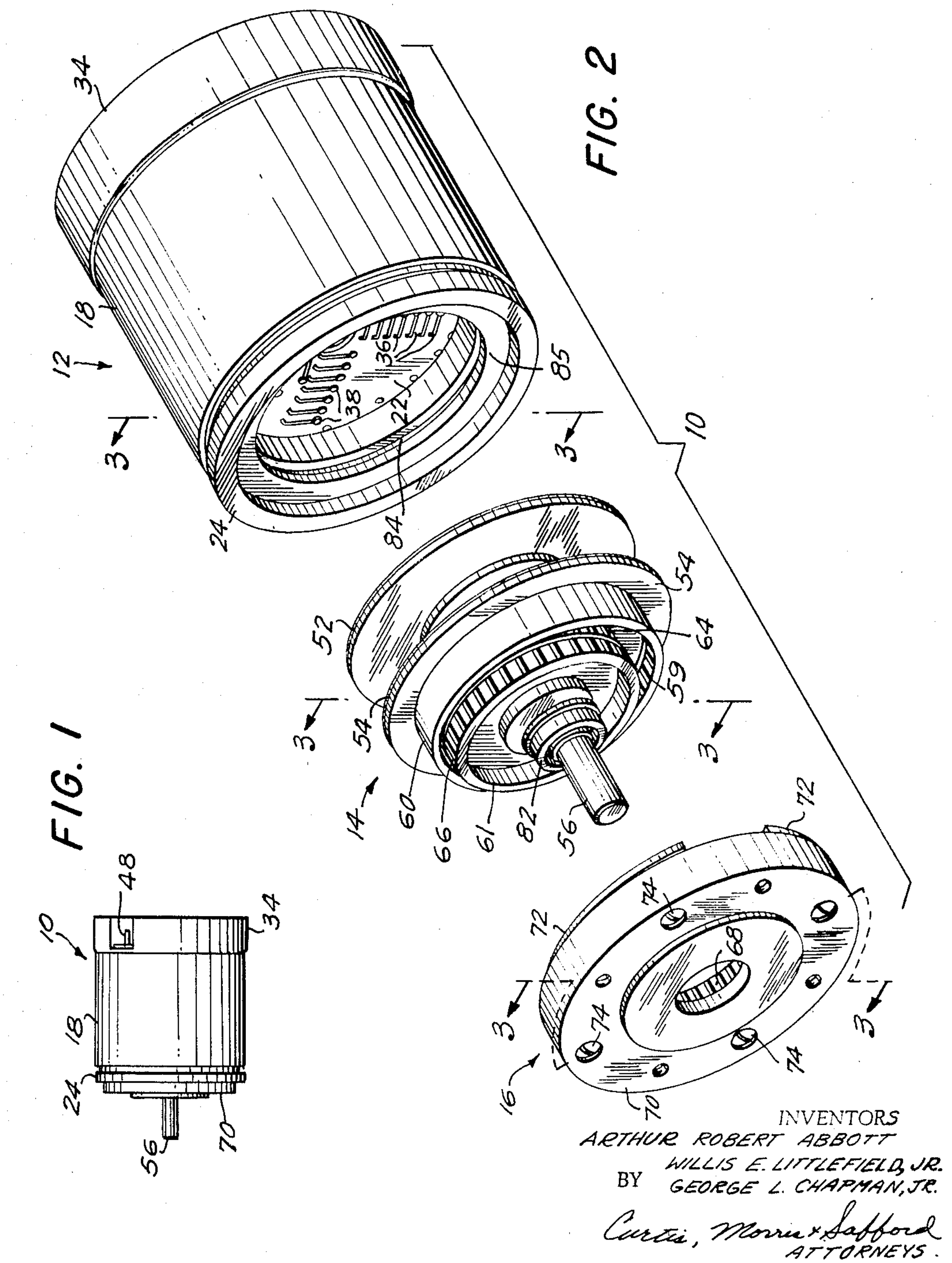
FIGURE 1 is an elevation view of an analog-to-digital converter constructed in accordance with the present invention.
FIGURE 2 is an enlarged and semi-exploded perspective view of the converter shown in FIGURE 1.
Figure 3:
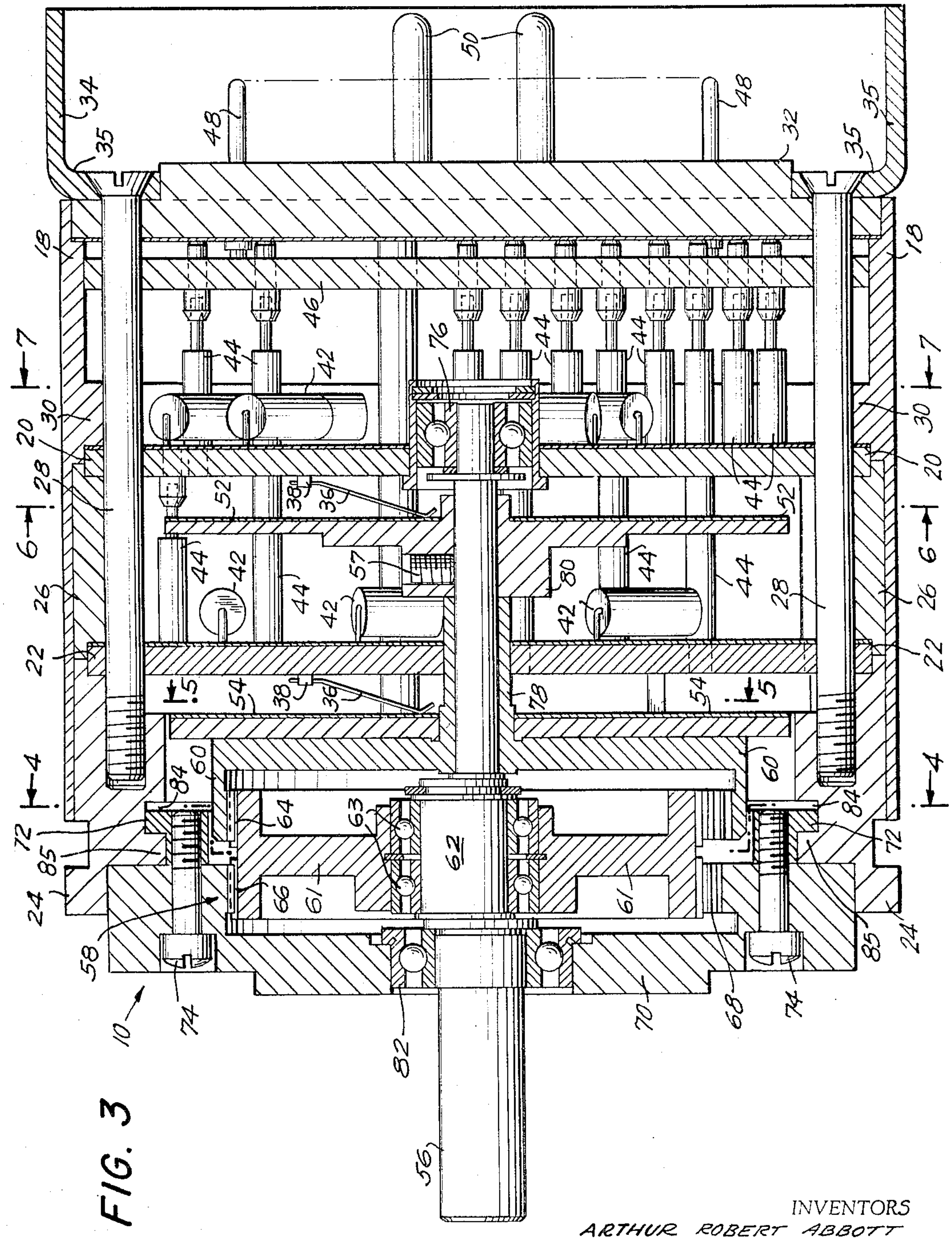
FIGURE 3 is an enlarged secton view taken along lines 3—3 of FIGURE 2, in the direction indicated by the arrows.

The analog-to-digital converter indicated generally at 10 in FIGURES 1 through 3 includes a housing assembly 12, a code disk assembly 14, and a cover assembly 16 (see FIGURE 2).

Referring now to FIGURE 3, housing assembly 12 includes a cylindrical housing shell 18 and a pair of brush-blocks 20 and 22 mounted securely in the housing assembly 12. The front brush-block 22 is mounted by being clamped at its edges between opposing surfaces of a cut-out portion in the rear edge of a mounting ring 24 and a similar cut-out portion in the forward edge of a cylindrical sleeve 26. The rear brush-block 20 (not visible in FIGURE 2) is held between opposing surfaces of a cut-out portion in the rear edge of sleeve 26 and an internal land 30 of housing shell 18. The mounting ring 24, sleeve 26 and both brush-blocks are secured together in a tight, substantially integral assembly by four screws 28 which are screwed into threaded holes in mounting ring 24. A plastic plate 32 is fitted into a cut-out portion in the rear edge of housing shell 18 and is secured to the remainder of the housing assembly by means of screws 28. A connector pin shield 34 also is secured to plate 32 and the housing assembly 12 by means of screws 28 which pass through holes in a flanged portion 35 of the shield 34.

It should be understood that FIGURE 2 is not a fully "exploded" view of the converter 10, but that the components are shown partially assembled. Also, the components are not necessarily arranged in the position they would have just after being "exploded." For example, when both brush-blocks 20 and 22 are secured in the housing assembly 12, code disk 52 must be located between them.

Figures 4, 5, 6, 7:
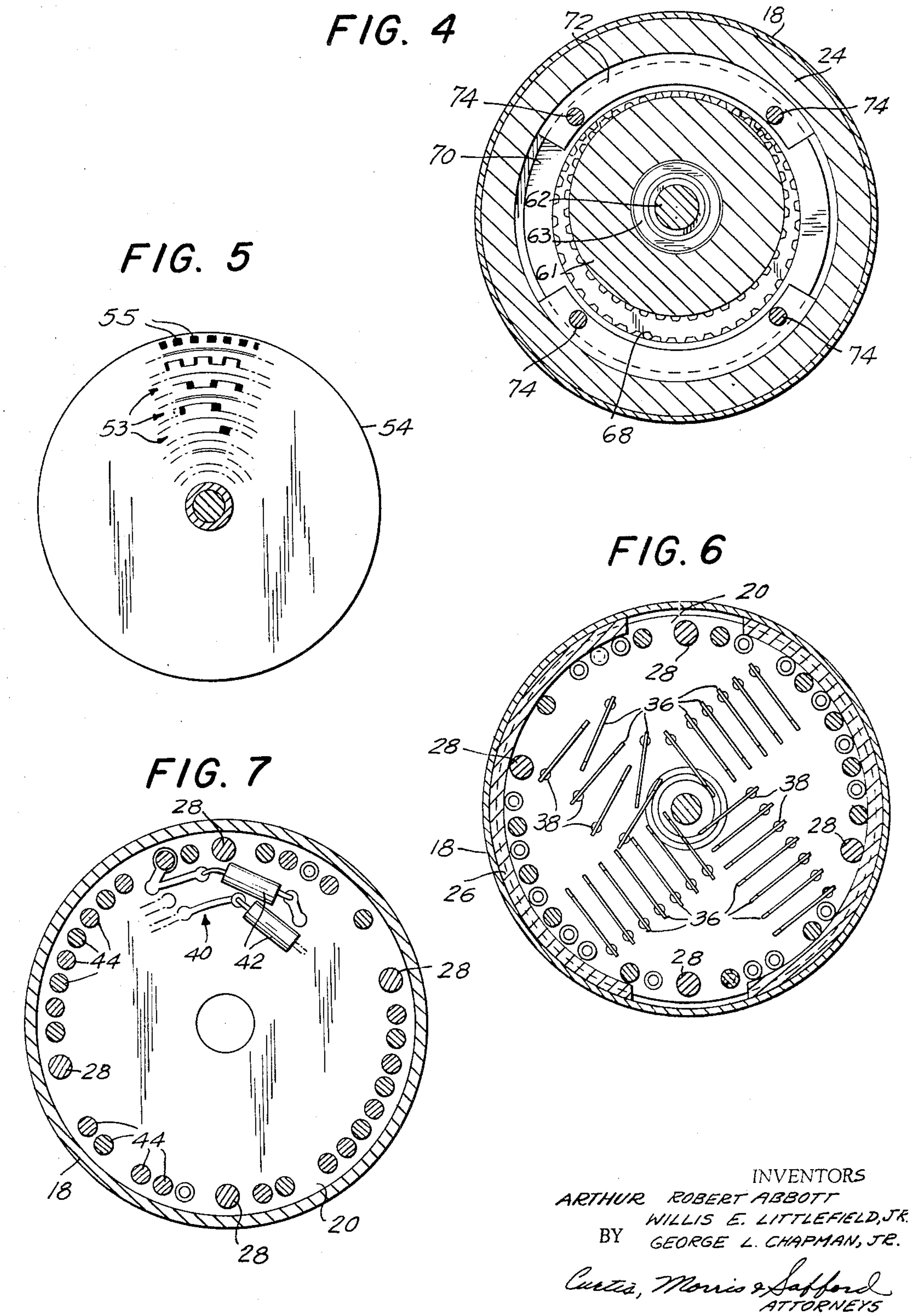
FIGURE 4 is a sectional view taken along line 4—4 of FIGURE 3, in the direction indicated by the arrows.
FIGURE 5 is a sectional and partly schematic view taken along line 5—5 of FIGURE 3, in the direction indicated by the arrows.
FIGURE 6 is a sectional view taken along line 6—6 of FIGURE 3, in the direction indicated by the arrows.
FIGURE 7 is a sectional view taken along line 7—7 of FIGURE 3, in the direction indicated by the arrows.

Referring now to FIGURES 6 and 7 as well as FIGURE 2, brush-blocks 20 and 22 both have a plurality of brushes 36 mounted on their front surfaces by means of metal pins 38 which pass through the material of the brush-blocks. On the opposite (rear) surface of each brush-block is a printed circuit arrangement, indicated generally at 40 (FIGURE 7), into which are connected a number of electrical circuit elements 42 (see also FIGURE 3) which form a part of well-known electrical circuitry used in conjunction with brushes 36 to aid in producing the output digital signals of the converter. Only a portion of this printed circuitry 40 is shown in FIGURE 7 in order to simplify the drawings.

A number of electrical connection posts 44 interconnect the printed circuitry 40 on each brush-block and make electrical connections to a connection board 46. As is shown in FIGURE 3, some of the connection posts 44 are connected between brush-blocks 22 and 20, and others are connected between brush-block 20 and a connection board 46. Other connection pins 44 are connected between connection board 46 and brush-block 22. Wherever necessary, posts 44 extend through holes located around the peripheries of the brush-blocks. The arrangement of these connection posts is such as to connect the brushes on the brush-blocks together in well-known circuit arrangements to provide a digitally-coded electrical output.

A number of external connection pins 48 are secured into the molded plastic insulating plate 32 and are connected into connection block 46. Only two of these pins 48 are shown in FIGURE 3 in order to simplify the drawings. Connection block 46 is a printed circuit board which is adapted to connect pins 48 and posts 44 in the desired circuit arrangement.

Several large, centrally-located pins 50 also are provided to serve as positioning pins and to strengthen the plug-in assembly. By means of these external connection pins 48 and 50, the converter unit 10 conveniently may be plugged into a mating electrical receptacle in the digital computer or other equipment in which the converter is to be used.

Referring now to FIGURE 2 as well as to FIGURE 3, code disk assembly 14 includes a high-speed rear code disk 52 and a low-speed forward code disk 54, with both code disks being drivably coupled to an input shaft 56.

As is shown in FIGURE 5, each of the rear surfaces of code disks 52 and 54 has a number of concentric rows 53 of insulating segments or strips 55 imbedded in conductive material, with insulating segments being indicated by darkened areas and conductive areas being light. Only a portion of the coded surface of the code disks is shown in FIGURE 5 in order to simplify the drawings. The insulating and conductive material patterns appearing on these disks are well-known in the prior art. When the brushes 36 are positioned on the brush blocks in any one of a number of well-known arrangements so as to contact various portions of each concentric row 53, and a voltage is applied to the disk by means of the brushes in a manner which also is well-known, a digitally-coded electrical output signal will be developed at the brush terminals and will be conducted to the external connection pins 48.

Rear code disk 52 is secured directly to shaft 56 by means of set-screws 57 and, therefore, rotates at the same speed as shaft 56. Forward code disk 54 is driven by shaft 56 at a lower speed through an epicyclic gear speed-reducing arrangement, indicated generally at 58 in FIGURE 3.

The epicyclic speed-reducing arrangement 58 includes a ring gear 60, and a spur gear 61 which is mounted on an eccentric portion 62 of shaft 56 by means of a ball bearing 63. Forward code disk 54 is secured directly to the rear surface of ring gear 60. Spur gear 61 has two sets of teeth 64 and 66. The rear set of teeth 64 meshes with the ring gear 60. The forward row 66 of teeth meshes with a ring gear 68 formed in a front cover plate 70.

Referring again to FIGURE 2 as well as to FIGURE 3, cover plate assembly 16 includes the cover plate 70 and a pair of generally semicircular locking rings 72 which are secured to cover plate 70 by means of four screws 74. The gear teeth forming ring gear 68 are cut into the internal surface of a rearwardly-extending flange portion of cover plate 70.

The housing assembly 12, the code disk assembly 14, and the cover plate assembly 16 are assembled together as shown in FIGURE 3. The rear end of shaft 56 turns in a ball bearing 76 which is securely mounted in a hole in rear brush-block 20. The rear hub portion 78 of ring gear 60 abuts against the forward hub portion 80 of code disk 52 so as to keep the code disks properly positioned on the shaft 56. By this means, code disk 52 is positioned adjacent rear brush-block 20, as shown in FIGURE 3. Cover plate 70 is mounted on shaft 56 by means of a ball bearing 82.

As is shown in FIGURE 3, locking rings 72 are generally L-shaped in cross-section with the outer-most portion of the rings forming an annular flange. This flange fits into a groove 84 which forms an annular flange 85 in mounting ring 24. When screws 74 are tightened, the flange portion of locking rings 72 is pulled tightly against the flange 85 in mounting ring 24 so that the cover 70 is secured tightly to the housing assembly 12. When screws 74 are loosened slightly, the cover plate 70 can be rotated about the axis of shaft 56 to adjust the angular positions of the code disks, as discussed below, without substantially breaching the protective enclosure for the internal components of the converter 10 formed by the housing assembly when the cover 70 is tightly secured to it. Thus, cover plate 70 can be so rotated without any substantial danger of allowing dirt or contaminating materials to enter the enclosure.

When the converter 10 is assembled as described above and shown in the drawings, it operates as follows: A rotary analog quantity, e.g., the position of a fluid level indicator shaft, is applied to input shaft 56. As shaft 56 is rotated, rear code disk 52 is rotated at the same speed. The epicyclic-gear speed-reducing arrangement 58 causes code disk 54 to be driven by shaft 56 at a speed which is a fraction (e.g., $\frac{1}{64}$) of the speed at which code disk 52 rotates. Brushes 36 contact portions of the rows 53 on the rear surfaces of code disks 52 and 54 and, with the application of an excitation voltage as described above, provide digitally-coded electrical output signals to external connection pins 48.

The outermost concentric row of insulating and conductive sections for high-speed disk 52 provides the least significant digit of the digital output, and those rows located inwardly from the outermost row provide more significant digits. Low-speed disk 54 provides more digits, and the concentric rows are arranged similarly to those on disk 52.

In the above-described converter, alignment of the code disks and the brush-blocks is performed easily. Either one or both of two alignments may be needed by a converter. First, it may be necessary to align the brushes with the proper conductive or insulating segments on the code disks to provide a precise "zero" setting for the converter. Secondly, it may be necessary to align the code disks with respect to one another to give them a selected phase relationship and ensure that certain insulating or conductive segments on one disk will be aligned at a given time with certain other segments on the other disk.

In making the first alignment, i.e., the alignment of the code disks with the brushes, shaft 56 is rotated until rear code disk 52 is positioned at a proper zero setting, and then code disk 54 is aligned with disk 52 by means of the second alignment described below. Alternatively, if disks 52 and 54 are already in proper phase relationship with respect to one another, they can be moved to a proper zero setting by loosening screws 74, locking shaft 56 and cover 70 together, and rotating them together with respect to housing assembly 12 to bring the disks to a "zero" setting on the brush blocks.

To make the second alignment, i.e., the alignment of the code disk with respect to one another, screws 74 are loosened and shaft 56 is locked together with housing assembly 12 while cover plate 70 is rotated. In this manner, code disk 52, which is secured directly to shaft 56, is held stationary while forward code disk 54 is rotated independently from disk 52 to align the disks with one another. This adjustment can be made with considerable ease and precision since the relatively large diameter of cover plate 70 makes the cover easy to grasp and turn in small increments.

When the above adjustments have been made, screws 74 may be tightened and the converter unit is once again securely assembled.

Many other advantages are provided by the converter of the present invention. First, since the brush-blocks are gripped tightly in the housing assembly 12 over relatively large areas of their surfaces, and since the blocks are locked securely together by connection posts 44, the brush-blocks cannot easily shift with respect to one another after they are once assembled. Thus, they will remain in alignment with respect to one another despite the subjection of the converter to considerable amounts of shock or vibration.

A further advantage of the present converter is that, since both of its brush-blocks are locked together, the rigid connecting posts 44 may be used to make electrical connections instead of the flexible wires used in previous devices. This greatly increases the reliability of the unit since there are no flexible wires to break under shock and vibration and since the posts add structural strength to the brush-block assembly. Further, the use of these posts reduces the time and cost required to manufacture the converter.

Still further, because of the compact internal epicyclic gearing and the unique connection post arrangement used, the converter unit can be made substantially shorter than similar prior art devices.

In addition, since the alignment of the brush-blocks and code disks may be performed as a final step in the assembly process, further manufacturing cost savings can be realized since these adjustments may be made as a part of the final electrical test which the unit must undergo. The mounting of the rear bearing 76 directly in rear brush-block 20 provides for another manufacturing cost reduction in that tolerances between these components need not be as close as in previous converters.

Another advantage of the present converter is that the use of internal epicyclic gearing provides a relatively large tooth contact-ratio between the spur and internal gears and reduces back-lash between the gears so as to average-out the normal tooth-to-tooth errors in the gear train. This provides improved accuracy. Also, with this arrangement, relatively inexpensive gears can be used in place of the highly expensive, high-precision gears required in previous converters.

The above description of the invention is intended to be illustrative and not limiting. Various changes or modifications in the embodiments described may occur to those skilled in the art and these can be made without departing from the spirit or scope of the invention as set forth in the claims.

We claim:

1. In an analog-to-digital converter, a support, a shaft mounted on said support, a plurality of code members drivably coupled to said shaft, gear means for drivably coupling one of said code members to said shaft and, in response to rotation of said shaft, driving said one code member at a speed different from the speed at which another of said code members is driven, means for sensing the coded information provided by said code members, and means for driving said one code member through said gear means and independently from said shaft to align said code members.

2. In an analog-to-digital converter, a support, a rotary member rotatably mounted on said support, a plurality of code members associated with said rotary member, speed-reducing means coupling one of said code members to said rotary member, the other of said code members being secured directly to said rotary member so that said other code member is driven at a speed equal to that of said rotary member and said one code member is driven at a speed less than that of said other code member, means for sensing the coded information provided by said code members, and means for driving said one code member through said speed-reducing means and independently from said rotary member to align said code members.

3. In an analog-to-digital converter, a support, a rotary member rotatably mounted on said support, a plurality of code members associated with said rotary member, means for indirectly coupling one of said code members to said rotary member, means for driving said one code member through said indirect coupling means and independently from said rotary member to align said code members, means for sensing the position of said code members in said housing, and means for driving at least two of said code members with respect to said housing without creating any substantial relative motion between said two code members to align said code members with respect to said position-sensing means in said housing.

4. In an analog-to-digital converter, a support, a rotary member rotatably mounted on said support, a plurality of code members associated with said rotary member, means for indirectly coupling one of said code members to said rotary member, and means for sensing the coded information provided by said code members, said indirect coupling means comprising internal epicyclic gearing adapted to cause said rotary member to drive said one of said code members at a speed reduced from the speed at which at least one other of said code members is rotated.

5. In an analog-to-digital converter, a support structure, at least one rotatable code member rotatably associated with said support structure, a plurality of sensing elements for detecting the coded information provided by said code member, at least one mounting member for supporting said sensing elements, said mounting member being secured to said support structure and a plurality of solid, substantially inflexible electrically conductive members electrically connected to said sensing elements for transmitting coded electrical signals from said sensing elements.

6. In an analog-to-digital converter, a support structure, at least one rotatable code member rotatably associated with said support structure, a plurality of sensing elements for detecting the coded information provided by said code member, at least one mounting member for supporting said sensing elements, said mounting member being secured to said support structure, a plurality of solid, substantially inflexible electrically conductive members electrically connected to said sensing elements for transmitting coded electrical signals from said sensing elements, and electrically conductive pins extending outwardly from said support structure of said converter, said pins being electrically connected to said conductive members and adapted to provide for convenient electrical connection of said converter into associated equipment by plugging said pins into mating electrical receptacles.

7. In an analog-to-digital converter, a plurality of rotatable code members rotatably associated with said support structure, a plurality of sensing elements for detecting the coded information provided by said code members, a plurality of mounting members for supporting said sensing elements, said mounting members being secured to said support structure, a plurality of solid, substantially inflexible electrically conductive members electrically connected to said sensing elements for transmitting coded electrical signals from said sensing elements, said conductive members extending between and being secured to said mounting members to make electrical connections between said mounting members and to add structural stability to said converter apparatus.

8. An analog-to-digital converter comprising, in combination, a housing, an input shaft rotatably mounted in said housing, a plurality of disk-shaped code members each of which bears on one of its surfaces alternately-positioned electrically insulating and conductive sections arranged in concentric rows in a pattern adapted to provide a digitally-coded electrical output when said code member is electrically energized and aligned with brushing electrical contacts positioned to contact selected portions of each of said rows of sections and adapted to sense the coded information appearing on said code members, a speed-reduction gear train coupling one of said code members to said input shaft so that said one code member is driven by said shaft at a speed lower than that of said shaft, the other of said code members being secured directly to said shaft so that said other code member is driven at a speed equal to that of said shaft, a cover plate for said housing, a portion of said cover plate comprising a gear in said speed-reduction gear train, and means for securing said cover plate to said housing, said securing means being releasable from outside the enclosure formed by said housing and said cover plate to provide for movement of said cover plate with respect to said housing and a resulting movement of said one code member independently from said shaft to align said code members with respect to one another.

9. In an analog-to-digital converter, a housing, an input shaft rotatably mounted in said housing, a plurality of code members associated with said shaft, means for sensing the coded information provided by said code members, and an aligning member positioned outside of the enclosure provided by said housing, said aligning member being adapted to be moved with respect to said housing to align said code members in said housing without substantially breaching said enclosure.

10. In an analog-to-digital converter, a housing, an input shaft rotatably mounted in said housing, a plurality of code members associated with said shaft, means for sensing the coded information provided by said code members, a cover plate for said housing, and means for securing said cover plate to said housing, said cover plate being drivably coupled to at least one of said code members for aligning said code members in response to forces applied to the exterior of said cover plate.

11. In an analog-to-digital converter, a housing, an input shaft rotatably mounted in said housing, a plurality of code members associated with said shaft, means for sensing the coded information provided by said code members, a cover plate for said housing, and means for securing said cover plate to said housing, said cover plate being drivably coupled to at least one of said code members for aligning said code members in response to forces applied to the exterior of said cover plate, said securing means being releasable from outside the enclosure formed by said housing and said cover plate to provide for movement of said cover plate with respect to said housing.

12. In an analog-to-digital converter, a generally cylindrically-shaped housing having an open end with one annular flange at its edge, an input shaft rotatably mounted in said housing, a plurality of code members associated with said shaft, means for sensing the coded information provided by said code members, a cover plate for covering said open end of said housing, and means for securing said cover plate to said housing, said securing means being releasable from outside the enclosure formed by said housing and said cover plate to provide for movement of said cover plate with respect to said housing, said securing means comprising at least one generally circular locking ring having a flange portion adapted to mate with said annular flange at said housing edge, and means for clamping said annular flange tightly between said flange portion of said locking ring and said cover plate.

13. In an analog-to-digital converter, a housing, an input shaft rotatably mounted in said housing, a plurality of code disks associated with said shaft, speed-reducing means coupling one of said code disks to said shaft, said speed-reducing means comprising, in combination, an excentric portion in said shaft, a spur gear rotatably mounted on said excentric portion, a first ring gear secured to said housing and mating with said spur gear, and a second ring gear mating with said spur gear and secured to said one code disk.

14. Apparatus as in claim 13 including a cover plate for said housing, and wherein said first ring gear forms an integral part of said cover plate.

15. In an analog-to-digital converter, a housing, an input shaft rotatably mounted in said housing, a plurality of disk-shaped code members each of which bears on one of its surfaces alternately-positioned electrically insulating and conductive sections arranged in concentric rows in a pattern adapted to provide a digitally-coded electrical output when said code member is electrically energized and aligned with brushing electrical contacts positioned to contact selected portions of each of said rows of sections and adapted to sense the coded information appearing on said code members, a plurality of brushing electrical contacts for detecting the coded information provided by said code members, a plurality of brush-blocks secured to said housing, said brushing contacts being mounted in a predetermined, code-sensing pattern on said brush-blocks, a plurality of solid, substantially inflexible electrically conductive members electrically connected to said brushing contacts for transmitting coded eletrical signals from said brushing contacts, said conductive members extending between and being secured to said brush-blocks to make electrical connections between said brush-blocks and to add structural stability to said converter apparatus, and electrically conductive pins extending outwardly from said housing of said converter, said pins being electrically connected to said conductive members, structurally supported by said housing, and adapted to provide for convenient electrical connection of said converter into associated equipment by plugging said pins into mating electrical receptacles.

References Cited by the Examiner

UNITED STATES PATENTS 3,216,007 11/1965 Mazer ------------ 340—347

MAYNARD R. WILBUR, *Primary Examiner.*

K. R. STEVENS, A. L. NEWMAN, *Assistant Examiners.*